April 24, 1928.  G. A. FRIEDRICH  1,667,470
AUTOMOBILE SIGNAL
Filed March 14 1927
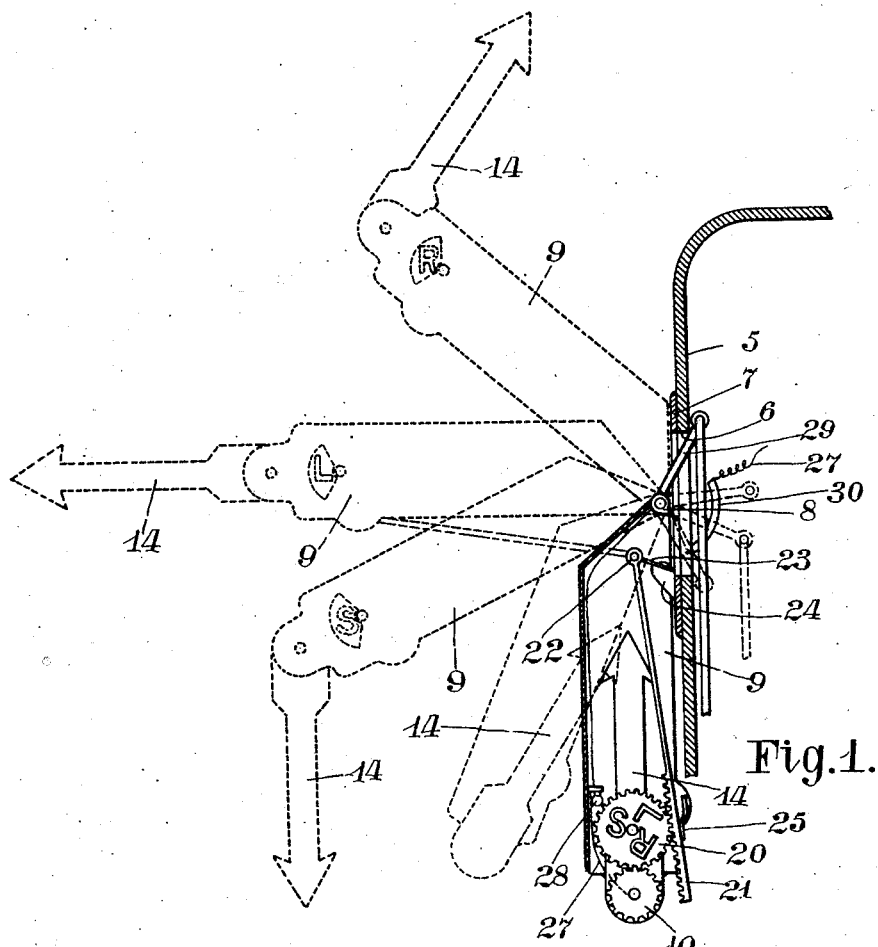
Fig.1.
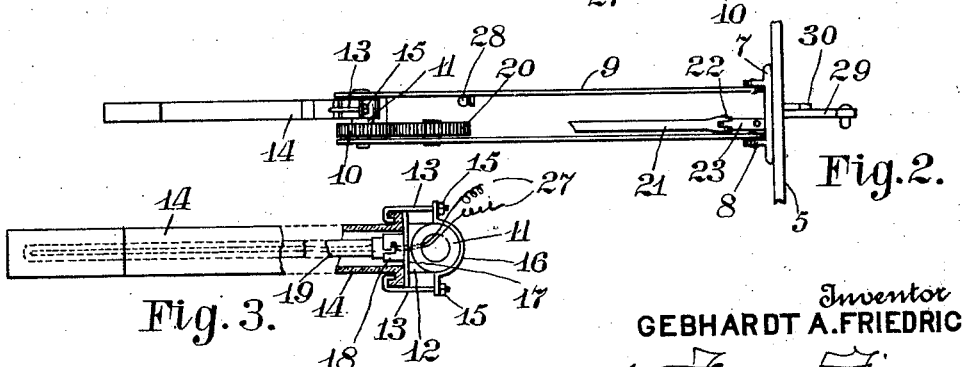
Fig.2.
Fig.3.
Inventor
GEBHARDT A. FRIEDRICH
his Attorneys Patented Apr. 24, 1928.

1,667,470

UNITED STATES PATENT OFFICE.

GEBHARDT A. FRIEDRICH, OF COLUMBUS, OHIO.

AUTOMOBILE SIGNAL.

Application filed March 14, 1927. Serial No. 175,180.

This invention relates to automobile signaling devices designed to indicate to the drivers of other vehicles the driving intention as to stopping and turning of the automobile carrying the signal. Heretofore signalling devices of this kind, while fairly visible in daylight have not been clearly visible at night. A further fault of such devices has been that their functioning was not immediately and clearly understandable but have required long use to educate the public as to the significance of all the signals. The object of the present invention, therefore, is to provide an improved apparatus of the kind in which visibility is as good as or better at night than in daylight.

The invention is embodied in the example herein shown and described the features of novelty being finally claimed.

In the accompanying drawing—

Figure 1 is a view looking from the rear of an automobile showing my invention as applied thereto.

Fig. 2 is a plan view of the horizontally extended apparatus with a portion broken out.

Fig. 3 is an enlarged detail view partially in section of the pointer member.

In the views 5 designates a fraction of the side wall of the body of the automobile near the front and at the left hand side thereof. Said portion of the wall is provided with an opening 6 and a surrounding reinforcing and supporting plate or frame 7 also provided with a corresponding opening. Said plate is provided with a suitable pivot bearing 8 on which is hung a case or frame 9 of metal or opaque material and of flat box-like form open at one edge next the car body and also open at its lower end. The pivoted end of said case is preferably made sloping to shed water.

Within the case 9 at its lower end is journaled a gear wheel 10 having a portion 11 of its shaft enlarged and provided with a lateral boss 12 flat on its outer end and upon said boss is secured by hook bolts 13 the pointer member 14 in the form of an arrow made hollow and of transparent or translucent glass. Said hook bolts with the pointer member are secured to the said shaft by nuts 15 engaging a strap 16 embracing the opposite side of the shaft. Between the end of the pointer member and the boss 12 is a plate 17 carrying a socket 18 to receive, in the usual manner, an electric lamp 19 extending into the pointer and made of a length nearly equal to the length of the pointer member so as effectively to illuminate the pointer member for substantially its entire length.

Journaled within the case and to one wall thereof is a large gear 20 meshed with the gear 10. Said gear 20 has cut in it through openings of the forms of the letters S, R and L being the initials of the words slow, right and left respectively. The larger gear 20 is engaged by a rack bar 21 pivoted at 22 to the end of a spring 23 secured to and lying on the upper side of a fixed lug 24 so that in operation said rack bar can yield as far as necessary to stress toward the pivoted closed end of the case but not toward the free end thereof. A spring 25 on the case holds the rack bar with its rack constantly engaged with the larger gear 20. The pivot 22 of the rack bar is so located with reference to the hinge 8 of the case that movement of the case causes a rotation of the large gear by the rack in a direction to swing the pointer member out of the case when the latter is moved from the solid line position shown in Fig. 1 to the several broken line positions shown in the same view. By reason of the relative position of the pivots 22 and 8 the initial movement of the pointer is relatively slow and will therefore emerge slowly from the open edge of the case hence its swing is not interfered with by the side of the car as indicated by the first broken line position beyond the normal. Reversely, that is when the case is swung from an elevated position toward the side of the car, the pointer is turned by the rack into the case in season to avoid striking the side of the car.

The wall of the case adjacent the bearing of the large gear wheel 20 is provided with a sector-shaped opening of sufficient size to permit the display of the whole of one of the letters S, L, R, at one time as the case is shifted to the several signaling positions. The signal letters are so located in the wheel 20 that each can show as a whole through said sector-like opening when the case and pointer are in substantially the three upper extended positions indicated by broken lines in Fig. 1.

The lamp of the pointer is electrically illuminated from the ordinary source of electricity carried by the automobile by means of suitable conductors 27 extended through the box and the hollowed axle of the gear 10. In series with the lamp 14 of the pointer there is shown a lamp 28 for illuminating the openings forming the letters S, R, L.

Fixed to the upper end of the case near the point of its hinged connection with the body of the car is an arm 29 that extends through the aforesaid opening the end of said arm having attached thereto a rod extended to any suitable means for the operation of the signal by the driver to move it to any desired signaling position. Gravity can be utilized to return the signal to normal position shown by the solid lines Fig. 1.

Fixed on the car is an arcuate contact member 30 in contact with which the arm 29 passes to make and break the circuit that illuminates the lamps when the signals are to be displayed, said arcuate member not extending sufficiently upward to keep the lamp circuit closed when the case is hanging down in normal position.

In ordinary running the case with the pointer concealed therein is allowed to hang in the normal position near the side of the car as indicated by said solid lines. When about to stop the driver raises the signal to position to expose the letter S, in which position the pointer hangs downward toward the road. When a left turn is to be made the driver further elevates the device to horizontal position in which event the letter L is exhibited and the pointer turned to point directly to the left. When a right turn is to be made the driver effects a further elevation of the device causing the pointer to point toward the right and the letter R exhibited. The operation of the signal can be the same either in the day or night, but because both the pointer and the letter can be illuminated the indications at night are perhaps, by contrast, even more distinct than in daylight. An important feature of the invention is that the construction is such that for the left and right turns the same pointer is used to point in said directions thereby rendering it immediately apparent to other drivers and pedestrians the direction intended to be taken.

The forms of the parts can be changed without departing from the gist of the invention as claimed. The term "translucent" is used in a broad sense including transparent.

What I claim is:

1. A direction indicator mechanism for attachment to a motor vehicle comprising, in combination, a swinging casing or frame having its outer edge closed and its inner edge open, a translucent pointer pivoted therein, means for moving said pointer into said casing and out of the open edge of the same into three different indicating positions, and means within the pointer for illuminating the same.

2. A direction indicator mechanism for attachment to a motor vehicle comprising, in combination a swinging casing or frame having its outer edge closed and its inner edge open, a translucent pointer pivoted therein, means for moving said pointer into said casing and out of the open edge of the same into different indicating positions, and means within the pointer for illuminating the same, a rotary wheel actuated with the pointer moving means and having indicating characters corresponding with and presented to view contemporaneously with the presentation of corresponding indications by the pointer.

3. A direction indicator mechanism for attachment to a motor vehicle comprising, in combination a swinging casing or frame having its outer edge closed and its inner edge open, a translucent pointer pivoted therein, means for moving said pointer into said casing and out of the open edge of the same into different indicating positions, and means within the pointer for illuminating the same, a rotary wheel actuated with the pointer moving means and having indicating characters corresponding with and presented to view contemporaneously with the presentation of corresponding indications by the pointer, and means for illuminating the characters.

4. A direction indicator mechanism for attachment to a motor vehicle comprising, in combination, a swinging frame or casing, a pointer pivoted in the free end of said casing and means actuated by the movement of the casing for moving said pointer into said frame or casing and out of the same at the edge next the vehicle into positions to point downward, to the left and to the right.

5. A direction indicator mechanism for attachment to a motor vehicle comprising, in combination, a swinging frame or casing, a pointer in said casing, and means actuated by the movement of the casing for moving said pointer from the edge thereof next the vehicle into position to point downward, to the left, and to the right.

6. A direction indicator mechanism for attachment to a motor vehicle comprising, in combination, a frame or casing having a pivot on which it swings, a pointer pivoted in said casing, and means actuated by the movement of the casing for moving said pointer out of said casing toward the side of the vehicle and successively into position to point downward, to the left and the right, said means including a spur gear concentric with the pivot of the pointer, a spur gear meshing therewith, and a rack engaging said last named gear, the rack being pivoted in eccentric relation to the pivot of the casing.

7. A direction indicator mechanism for attachment to a motor vehicle comprising, in combination, a swinging casing or frame having its outer edge closed and its inner edge open, a pointer therein, means for moving said pointer into the open edge of the casing and out of the same toward the side of the vehicle into three different indicating positions including right and left turning indications.

GEBHARDT A. FRIEDRICH.